United States Patent
Hikosaka

(10) Patent No.: US 9,645,324 B2
(45) Date of Patent: May 9, 2017

(54) OPTICAL CONNECTOR

(71) Applicant: Yazaki Corporation, Minato-ku, Tokyo (JP)

(72) Inventor: Tomohiro Hikosaka, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/819,495

(22) Filed: Aug. 6, 2015

(65) Prior Publication Data
US 2015/0338581 A1 Nov. 26, 2015

Related U.S. Application Data

(63) Continuation of application No. PCT/JP2014/053372, filed on Feb. 13, 2014.

(30) Foreign Application Priority Data

Feb. 15, 2013 (JP) ................................ 2013-028020

(51) Int. Cl.
G02B 6/38 (2006.01)
(52) U.S. Cl.
CPC ......... G02B 6/3826 (2013.01); G02B 6/3833 (2013.01); G02B 6/3887 (2013.01); G02B 6/3879 (2013.01)
(58) Field of Classification Search
USPC .................................................... 385/60, 72
See application file for complete search history.

(56) References Cited

U.S. PATENT DOCUMENTS

| 5,366,256 | A  | * | 11/1994 | Pruzin ...................... F16L 5/00 |
|           |    |   |         | 285/140.1 |
| 6,390,687 | B1 |   | 5/2002  | Shirakawa |
| 8,845,209 | B2 |   | 9/2014  | Hikosaka et al. |
| 9,033,591 | B2 |   | 5/2015  | Hikosaka et al. |
| 2001/0043775 | A1 |   | 11/2001 | Shirakawa et al. |
| 2008/0175540 | A1 | * | 7/2008  | Zheng .................. G02B 6/3838 |
|           |    |   |         | 385/60 |

(Continued)

FOREIGN PATENT DOCUMENTS

JP 2001-249253 A 9/2001
JP 2005-189288 A 7/2005

(Continued)

OTHER PUBLICATIONS

May 13, 2014—Written Opinion of the ISA—Intl App PCT/JP2014/053372, Eng Tran.

(Continued)

*Primary Examiner* — Eric Wong
(74) *Attorney, Agent, or Firm* — Banner & Witcoff, Ltd.

(57) ABSTRACT

An optical connector includes a ferrule, a ferrule retaining member having, at its rear end portion, a fastening portion into which an optical fiber is inserted and onto which a tightening ring configured to hold a tensile strength wire and a jacket in place is tightly fastened, a housing, and a fiber insertion passage formed through the fastening portion. The fiber insertion passage has an expansion space that ensures an interference avoidance gap with an outer circumference of the optical fiber inserted inside the fastening portion.

8 Claims, 7 Drawing Sheets

(56) References Cited

U.S. PATENT DOCUMENTS

| | | | |
|---|---|---|---|
| 2010/0008630 A1* | 1/2010 | Marrapode | G02B 6/4292 |
| | | | 385/78 |
| 2012/0155810 A1 | 6/2012 | Nakagawa | |
| 2013/0163931 A1* | 6/2013 | Enomoto | G02B 6/3858 |
| | | | 385/60 |
| 2013/0266270 A1 | 10/2013 | Hikosaka et al. | |
| 2014/0037252 A1 | 2/2014 | Hikosaka et al. | |
| 2014/0044397 A1 | 2/2014 | Hikosaka et al. | |

FOREIGN PATENT DOCUMENTS

| | | |
|---|---|---|
| JP | 2011-075743 A | 4/2011 |
| JP | 2012-014111 A | 1/2012 |
| JP | 2012-128341 A | 7/2012 |
| JP | 2012-150424 A | 8/2012 |
| JP | 2012-194355 A | 10/2012 |
| JP | 2012-220731 A | 11/2012 |
| JP | 2014-056229 A | 3/2014 |

OTHER PUBLICATIONS

May 13, 2014—International Search Report—Intl App PCT/JP2014/053372.
Oct. 18, 2016—(JP) Notification of Reasons for Refusal—App 2013-028020, Eng Trans.

\* cited by examiner

OPTICAL CONNECTOR

CROSS REFERENCE TO RELATED APPLICATIONS

This application is a continuation of International Patent Application No. PCT/JP2014/053372 filed on Feb. 13, 2014, claiming priority from Japanese Patent Application No. 2013-028020 filed on Feb. 15, 2013, the contents of which are incorporated herein by reference.

FIELD OF INVENTION

The present invention relates to an optical connector.

BACKGROUND ART

An optical connector used for interconnecting optical fibers in a car LAN or the like has been known (see Patent Document 1). As shown in FIG. 7, this type of optical connector 500 has ferrules 506 fixed to distal ends of optical fibers 504 of an optical fiber cable 502, a housing 508 accommodating the ferrules 506, a stopper 510 to be attached to the housing 508, a plate spring 512 to elastically bias the ferrules 506 toward a distal end side of the housing 508, a fastening sleeve 514 a fiber insertion hole 515 into which the optical fibers 504 are inserted, a tightening ring 516 configured to attach at least one of a tensile strength wire and a jacket of the optical fiber cable 502 to a fastening portion of the fastening sleeve 514, and a boot 518.

The housing 508 has a structure in which a connector fitting portion 520 to be fitted into a housing of a not-shown counterpart connector is provided on the distal end side of the housing 508, and a ferrule receiving space for receiving the ferrules 506 is provided on a proximal end side of the housing 508. The stopper 510 is mounted into the ferrule receiving space of the housing 508 to position the ferrules 506 inside the housing 508 and prevent the plate spring 512 from coming off. The plate spring 512 biases the ferrules 506 inside the ferrule receiving space toward the counterpart connector side. The plate spring 512 is provided so that a gap value between ferrule end surfaces opposed to each other due to fitting connection between the connectors can be reduced to improve transmission performance.
Patent Document 1: JP2012-150424A

SUMMARY OF INVENTION

The optical connector 500 has a problem that there are many pre-insertion components such as the fastening sleeve 514, the tightening ring 516, the boot 518 and the like, thereby resulting in an inefficient terminal processing work. Therefore, there has been proposed an optical connector in which fiber insertion grooves for inserting optical fibers into a fastening sleeve and receiving the optical fibers therein are recessed in a side surface of the fastening sleeve so as to make it unnecessary to put the fastening sleeve onto the optical fibers in advance, to thereby improve terminal processing work. However, in the fastening sleeve having fiber insertion grooves recessed in its side surface, the groove width of each of the fiber insertion grooves is narrowed easily during fastening work in comparison with the conventional fiber insertion hole 515 having a closed shape in cross-sectional view. When the width of the fiber insertion groove is narrowed to fix (hold) the optical fiber immovably, there is a possibility that a function of adjusting the fiber position when the optical connector is connected may deteriorate. For this reason, there is a problem that management of a tightening amount is so troublesome that fastening work may become inefficient. On the other hand, when the groove width of the fiber insertion groove is widened, there is another problem that the optical fiber comes off from the groove in an assembling step so easily that assembling may be deteriorated.

The present invention has been made in view of the above circumstances, and it is an object of the present invention to provide an optical connector in which an optical fiber is not held when a tightening member is subjected to fastening work so that the fastening work can be improved.

SOLUTION TO PROBLEM

The above object of the present invention is achieved by the following configuration.

(1) An optical connector including a ferrule configured to be connected to a cable distal end portion of an optical fiber cable, a fastening sleeve having, at a rear end portion thereof, a fastening portion inside which an optical fiber led out from the optical fiber cable, from which a tensile strength wire and a jacket are removed, is inserted, the fastening portion having an outer circumferential surface on which a tightening member configured to hold at least one of the tensile strength wire and the jacket in place is tightly fastened, a housing configured to accommodate the ferrule and the fastening sleeve, and a fiber insertion passage formed to extend through at least the fastening portion and having an expansion space that ensures an interference avoidance gap with an outer circumference of the optical fiber inserted inside the fastening portion onto which the tightening member is tightly fastened.

According to the optical connector having the aforementioned configuration (1), the optical fiber led from the optical fiber cable from which the jacket and the tensile strength wire are removed is inserted into the fiber insertion passage formed extend through at least the fastening portion of the fastening sleeve. The fiber insertion passage has the expansion space that ensures the interference avoidance gap prior to the fastening work of the tightening member, so that the inner surface of the fiber insertion passage can be spaced from the optical fiber sufficiently. At least one of the tensile strength wire and the jacket is placed on the outer circumferential surface of the fastening portion, and the tightening member further placed on the outer circumferential surface is tightly fastened so that at least one of the tensile strength wire and the jacket is pressed onto the fastening portion. At this time, the fastening portion is compressed and deformed. The deformation of the fastening portion narrows the fiber insertion passage in which the optical fiber is inserted, resulting in reduction of the expansion space provided in advance in the fiber insertion passage. Here, the expansion space remains as the interference avoidance gap when the fastening is completed. The optical fiber is spaced from the inner surface of the narrowed fiber insertion passage by the interference avoidance gap. That is, the optical fiber can be prevented from being held. Even when one side of the optical fiber in a diameter direction makes contact with the inner surface of the fiber insertion passage, the optical fiber is allowed to move in an axial direction for a fiber position adjustment function as long as the opposite side of the optical fiber is spaced from the inner surface. That is, even after the fastening work of the tightening member, the optical fiber can be inserted in a so-called floating structure so as not to interfere with the fiber insertion passage.

(2) The optical connector according to the configuration (1) described above, wherein: the fiber insertion passage is configured to have an opened cross section having a shape of a C-shaped groove.

According to the optical connector having the configuration (2) described above, the optical fiber can be inserted into the fiber insertion passage from a direction perpendicular to the axis so that the optical fiber cable does not have to be inserted into the fastening sleeve in advance. Accordingly, a fiber terminal processing work is improved. In addition, the fiber insertion passage is formed to have an opened cross section having a shape of a C-shaped groove. Accordingly, the width of the groove opening can be narrowed while the expansion space is ensured inside the groove. Consequently, the optical fiber inserted into the expansion space of the fiber insertion passage can be prevented from coming off easily at the time of processing the fiber terminal so that the fiber terminal processing work can be improved.

(3) The optical connector according to the configuration (1) or (2) described above, wherein a fiber retaining protrusion is provided to protrude from at least one of groove opening opposed surfaces of the fiber insertion passage to partially reduce a gap between the groove opening opposed surfaces that is wider than a diameter of the optical fiber.

According to the optical connector having the configuration (3) described above, the fiber retaining protrusion is provided to protrude from one of the groove opening opposed surfaces of the fiber insertion passage. Accordingly, the gap between the groove opening opposed surfaces that is wider than the diameter of the optical fiber can be partially reduced while the expansion space is ensured inside the groove. Consequently, the optical fiber inserted into the expansion space of the fiber insertion passage is engaged with the fiber retaining protrusion so that it is prevented from coming off easily at the time of processing the fiber terminal, whereby the fiber terminal processing work is improved.

While the present invention has been briefly described above, details of the present invention will be further apparent by reading through a mode for carrying out the invention (hereinafter "embodiment") described below with reference to the accompanying drawings.

EMBODIMENTS OF INVENTION

Figure 1:
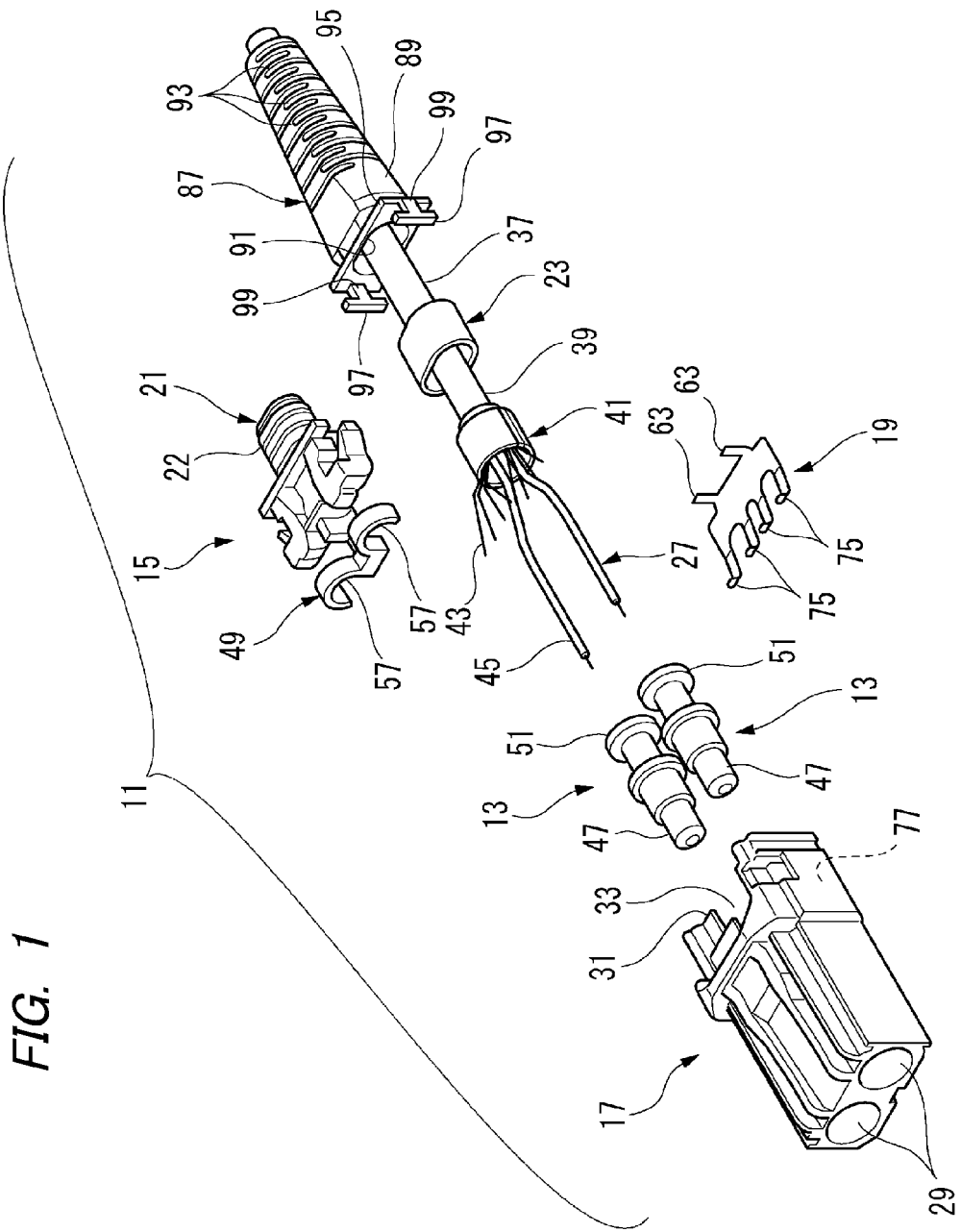
FIG. 1 is an exploded perspective view of an optical connector according to an embodiment of the invention.

An embodiment according to the invention will be described below with reference to the drawings. As shown in FIG. 1, an optical connector 11 according to an embodiment of the invention has a main configuration including ferrules 13, a ferrule retaining member 15 configured as fastening sleeve having a fastening portion 21, a housing 17, a spring member 19, a tightening ring 23 as a tightening member, and fiber insertion passages 25 formed in the ferrule retaining member 15. The optical connector 11 interconnects optical fibers in, for example, an automobile by being coupled to other optical fibers 27 or an optical communication device.

The housing 17 made of a synthetic resin has a pair of coupling opening portions 29 provided in the front of the housing 17 so as to be coupled to a not-shown mating optical connector. A rear opening 31 is formed at the rear of the housing 17. In the housing 17, a pair of ferrules 13 retained by the ferrule retaining member 15 are inserted from the rear opening 31 and received behind the coupling opening portions 29. In the description of the invention, the optical connector 11 will be described on the assumption that the coupling opening portions 29 are located in the front and the rear opening 31 is located at the rear.

A retaining member receiving space 33 is formed inside the housing 17. The retaining member receiving space 33 is opened in the rear so as to serve as the rear opening 31 in a rear end of the housing 17. A retaining member body portion 35 of the ferrule retaining member 15 is received in the retaining member receiving space 33. The ferrule retaining member 15 having the retaining member body portion 35 received in the retaining member receiving space 33 is mounted into the housing 17 in a state in which the fastening portion 21 protrudes from the rear opening 31.

The ferrules 13 are connected to distal end portions 45 of optical fibers 27 in an optical fiber cable 37. That is, a jacket 41 or a tensile strength wire 43 is removed from the optical fiber cable 37 to expose the two optical fibers 27, and the distal end portions 45 of the exposed optical fibers 27 are fixedly inserted into the ferrules 13 respectively. More specifically, internal coating is further removed from the optical fibers 27 to obtain bare fiber core wires, and the bare fiber core wires are fixedly inserted by an adhesive agent etc. while distal ends of the fiber core wires are disposed on distal end surfaces of ferrule small diameter portions 47. Annular portions 51 are provided protrusively in outer circumferential surfaces of the ferrules 13 so that the annular portions 51 can be locked by a support portion 49 of the ferrule retaining member 15, which will be described later, so as to be restrained from moving toward the distal end side. The ferrules 13 are accommodated inside the housing 17 so as to be movable in an axial direction by the ferrule retaining member 15, and are elastically biased toward the distal end side of the housing 17 by the spring member 19 attached to the ferrule retaining member 15.

The ferrules 13 are butt-connected to mating ferrules of a mating optical connector in coupling end surfaces of the ferrule small diameter portions 47. In this manner, the optical fibers 27 which have been terminated to be able to be connector-connected by the ferrules 13 are connected to optical fiber lines of the mating optical connector.

The ferrules 13 are elastically biased forward by the spring member 19 whose distal end is engaged with rear surfaces of the annular portions 51. Front surfaces of the annular portions 51 abut against the support portion 49 of the ferrule retaining member 15 so that the ferrules 13 can be prevented from protruding any further forward. When the ferrules 13 make butt-connection with the counterpart connector, the ferrules 13 can be pushed slightly rearward in a connection direction in the elastic deformation range of the spring member 19. Thus, the ferrules 13 can be prevented from damage etc. caused by excessive stress concentration. Configuration is made such that the biasing force of the spring member 19 acts as abutting force between the ferrules so as to obtain a desired connection loss stably.

Figure 2:
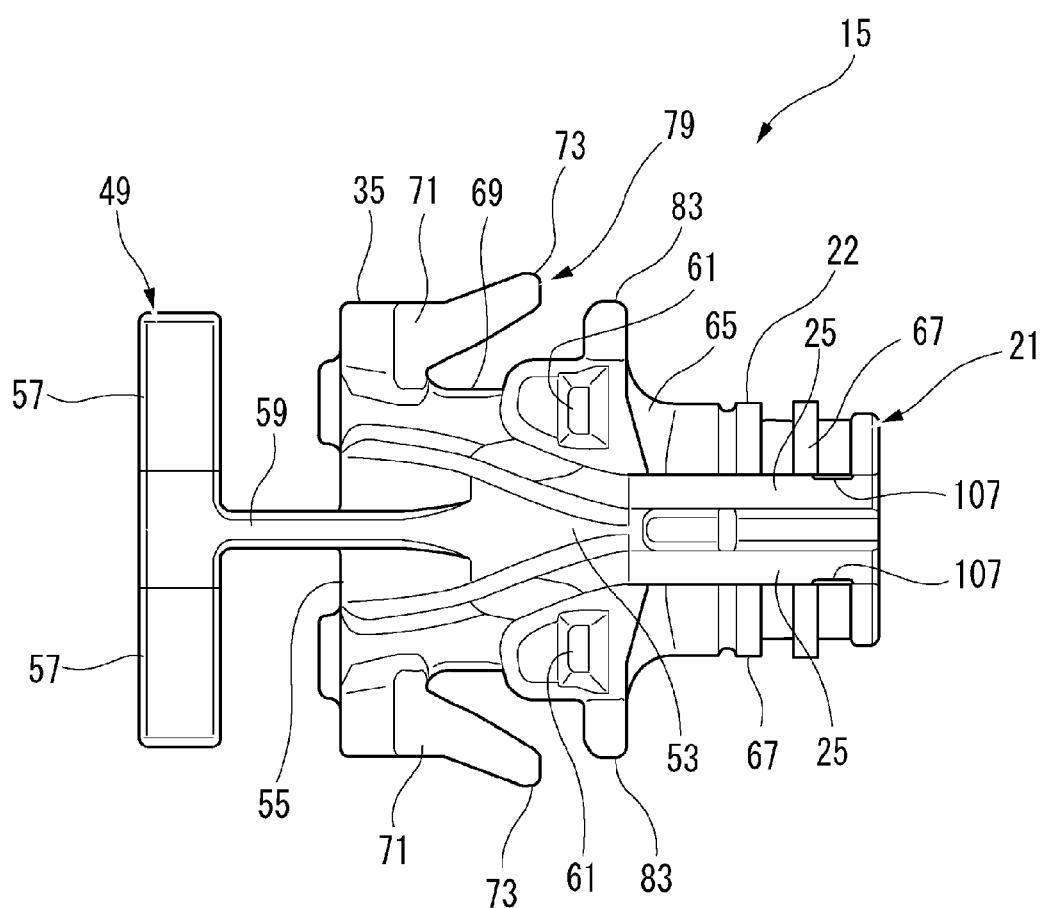
FIG. 2 is a bottom view of a fastening sleeve shown in FIG. 1, when seen from the lower side.

As shown in FIG. 2, the ferrule retaining member 15 is made of a hard resin material and has the retaining member body portion 35 in which a pair of fiber insertion passages 25 are formed so that the two optical fibers 27 can be placed inside the pair of fiber insertion passages 25 respectively. In the embodiment, each of the fiber insertion passages 25 is configured to have an opened cross section having a shape of a C-shaped groove. Alternatively, each of the fiber insertion passages 25 may be configured to have a closed cross section having a shape of an insertion hole.

The pair of fiber insertion passages 25 is recessed in a retaining member side surface 53 so that the fronts of the fiber insertion passages 25 can be positioned at an interval from each other. The fastening portion 21 is provided protrusively toward the rear in a rear end of the retaining member body portion 35. The fiber insertion passages 25 extend inside the fastening portion 21. The ferrule retention portion 15 is received inside the housing in a state in which the optical fibers 27 have been inserted into the fiber insertion passages 25. At the same time, the fastening portion 21 is led out from the rear opening 31 of the housing 17.

The ferrule retaining member 15 is mounted inside the housing 17 to position and to retain the ferrules 13 and the optical fibers 27 inside the housing 17. The support portion 49 is provided at a retaining member distal end portion 55 of the ferrule retaining member 15. The support portion 49 locks the annular portions 51 to restrain the ferrules 13 from moving toward the distal end side. The support portion 49 has U-shaped support portions 57 and an extending wall portion 59. The U-shaped support portions 57 extend along outer circumferential surfaces of the ferrules 13. The extending wall portion 59 is provided to connect the pair of U-shaped support portions 57 to the retaining member distal end portion 55. Each of the U-shaped support portions 57 is formed into a semicircular cylindrical shape so that the ferrules 13 can be placed on the U-shaped support portions 57 respectively so as to be supported thereby from below.

A pair of spring fixation portions 61 are formed in the retaining member side surface 53 of the retaining member body portion 35 so as to put the fiber insertion passages 25 therebetween. Engagement piece portions 63 of the spring member 19 which will be described later are fitted into the spring fixation portions 61.

The fastening portion 21 from which the optical fibers 27 are led out is provided in a retaining member rear end portion 65 of the ferrule retaining member 15. At least one of the tensile strength wire 43 and the jacket 41 of the optical fiber cable 37 is mounted on an outer circumference surface of the fastening portion 21 by the tightening ring 23. A plurality of annular protrusions 67 for improving strength of fastening of the jacket 41 and the like are formed in the axial direction in the outer circumferential surface 22 of the fastening portion 21. The annular protrusions 67 are cut off and notched to form the fiber insertion passages 25. In this manner, the optical fibers 27 can be inserted into the fiber insertion passages 25 in a perpendicular direction to the fiber axis. That is, it is not necessary to insert the optical fibers 27 into the fiber insertion passages 25 in advance as in the case of a closed cylinder.

Elastic lock pieces 71 are provided in outer side portions 69 on opposite sides of the retaining member body portion 35. The elastic lock pieces 71 have front ends connected to the retaining member body portion 35 and rear ends serving as free ends gradually separated from each other. That is, the elastic lock pieces 71 are opened in a V shape in plan view (see FIG. 2). Distal ends of the free ends are formed as lock claws 73. The elastic lock pieces 71 can be elastically deformed in a direction in which the lock claws 73 approach or leave the outer side portions 69. As will be described later, the lock claws 73 are locked by not-shown lock step portions provided internally in the housing 17.

Figure 4:
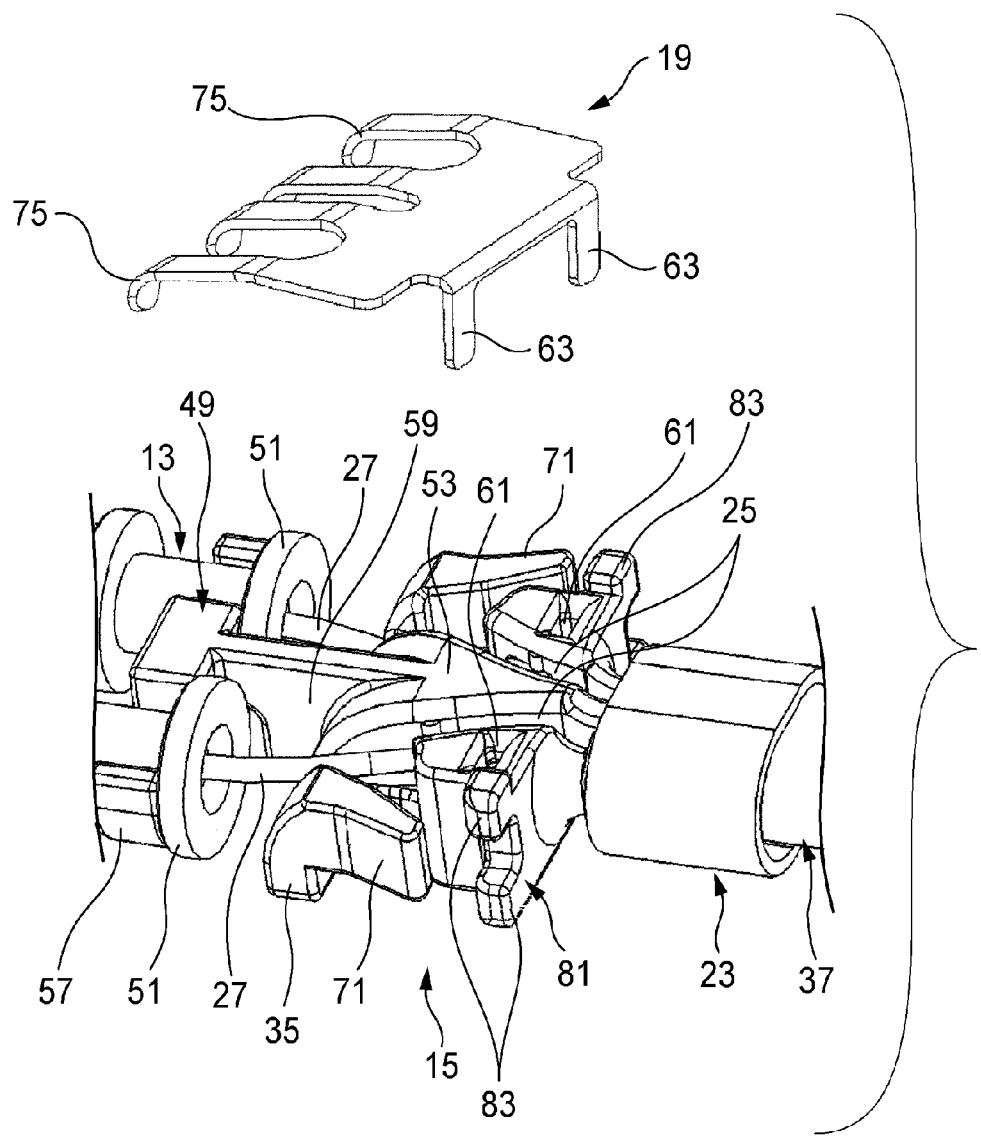
FIG. 4 is an exploded perspective view before a spring member is mounted on the fastening sleeve into which optical fibers have been mounted.

As shown in FIG. 1 and FIG. 4, the spring member 19 consists of a thin plate made of a metal material, a resin material, etc. high in spring characteristics. The spring member 19 has two pairs of parallel elastic arm pieces 75. Each of the optical fibers 27 is disposed between each pair of parallel elastic arm pieces 75. The ferrules 13 are pressed forward by distal ends of the elastic arm pieces 75. The pair of engagement piece portions 63 bent vertically downward on an opposite side to the elastic arm pieces 75 are formed in the spring member 19. The engagement piece portions 63 are engaged with the spring fixation portions 61 formed in the retaining member body portion 35. The engagement piece portions 63 are engaged with the spring fixation portions 61. In this manner, the spring member 19 can be prevented from being detached from the ferrule retaining member 15. The spring member 19 can be mounted on the ferrule retaining member 15 in a state that the fiber insertion passages 25 are covered with the spring member 19.

In the embodiment, the tightening ring 23 is formed into an elliptical cylindrical shape into which the two optical fibers 27 can be inserted. A metal material which is plastically deformed easily is used preferably for the tightening ring 23. The tightening ring 23 is put on the outer side of the jacket 41 and the like placed along the outer circumferential surface 22 of the fastening portion 21, and is plastically deformed to reduce its diameter so as to hold the jacket 41 and the like in place at the fastening portion 21.

Not-shown recess portions in which side wall inner surfaces 77 have been shaved outward relatively to the rear opening 31 are formed in the retaining member receiving space 33 of the housing 17. Lock step portions are formed between the recess portions and the side wall inner surfaces 77. The lock claws 73 of the aforementioned elastic lock pieces 71 abut against the lock step portions from the front to be locked therein.

That is, the ferrule retaining member 15 is inserted from the rear opening 31 of the housing 17 with the fastening portion 21 positioned at the rear. In the ferrule retaining member 15 inserted into the rear opening 31, the pair of the elastic lock pieces 71 on the opposite sides are bent by the side wall inner surfaces 77 in a direction to approach each other. When the ferrule retaining member 15 in which the elastic lock pieces 71 are bent is further inserted into the retaining member receiving space 33, the lock claws 73 of the elastic lock pieces 71 reach the recess portions. The pair of lock claws 73 having reached the recess portions are locked by the lock step portions when the elastic lock pieces 71 are open due to their elastic restoring forces. Thus, the ferrule retaining member 15 can be prevented from coming off rearward from the housing 17.

The optical fibers 27 in the optical fiber cable 37 are led out from the fastening portion 21 of the ferrule retaining member 15. On the other hand, the tensile strength wire 43 and the jacket 41 are placed on the outer circumferential surface of the fastening portion 21. The tightening ring 23 shaped like an elliptical cylinder is tightly fastened from the outside of the tensile strength wire 43 and the jacket 41 placed on the fastening portion 21, so that the tensile strength wire 43 and the jacket 41 are held in place at the fastening portion 21. In this manner, the optical fiber cable 37 and the ferrule retaining member 15 are fixed integrally with each other. Configuration is made such that, when the optical fiber cable 37 is pulled rearward, the lock claws 73 abut against the lock step portions to restrain the ferrule retaining member 15 from coming off. That is, the rear opening 31, the recess portions, the lock step portions, the elastic lock pieces 71 and the lock claws 73 form a lock mechanism by which the ferrule retaining member 15 can be inserted from the rear opening 31 of the housing 17 and prevented from coming off from the inside of the housing.

Figure 3:
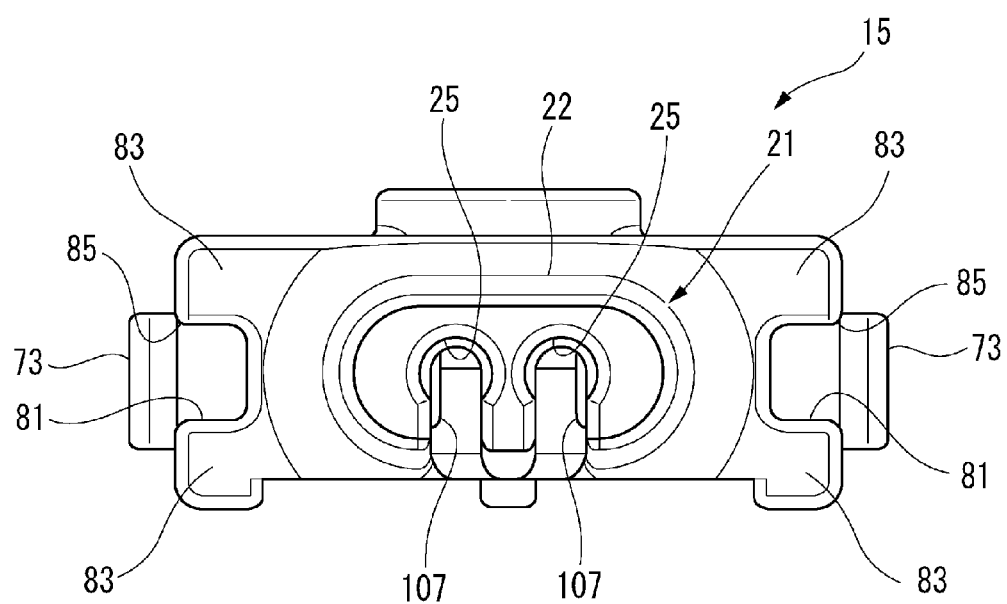
FIG. 3 is a back view of the fastening sleeve shown in FIG. 2, when seen from the rear.

Boot lock notch portions 81 are formed in a rear end of the ferrule retaining member 15 in the outer side portions 69. Each of the boot lock notch portions 81 is formed between a pair of notch formation pieces 83 protruding vertically toward the outside from a corresponding one of the outer side portions 69 of the rear end of the retaining member body portion 35. Accordingly, each of the boot lock notch portions 81 is open to form an opening end 85 in a gap between distal ends of the notch formation pieces (see FIG. 3). When the ferrule retaining member 15 is inserted into the retaining member receiving space 33 of the housing 17, the opening ends 85 of the boot lock notch portions 81 are closed by the side wall inner surfaces 77 of the housing 17. That is, the boot lock notch portions 81 made open become hole shapes with the opening ends 85 being closed by the side wall inner surfaces 77.

The boot lock notch portions 81 serve as places for preventing the boot 87 from coming off.

The boot 87 is made of a soft material such as synthetic rubber. The boot 87 has a protection portion 89 which covers the outer circumference of the optical fiber cable 37 and the outer circumference of the tightening ring 23 made of metal. A fastening portion receiving hole 91 is formed on a proximal end side of the protection portion 89. The fastening portion receiving hole 91 covers, from the outer circumferential side, the tightening ring 23 tightly holding the tensile strength wire 43 and the jacket 41 of the optical fiber cable 37 at the fastening portion 21. A plurality of circumferential grooves 93 which give suitable bendability to the protection portion 89 are formed in the circumference of the protection portion 89. The boot 87 has a rectangular flange portion 95 which is provided consecutively to the protection portion 89 to cover the rear opening 31 of the housing 17.

T-shaped protrusions 97 are provided on opposite sides of the flange portion 95 to protrude toward the front (the inner side of the housing). The aforementioned boot lock notch portions 81 and the T-shaped protrusions 97 are provided in pairs symmetrically with respect to the fastening portion 21. In the T-shaped protrusions 97, distal ends of neck portions 99 protruding vertically from the flange portion 95 serve as bulging portions. In the embodiment, the bulging portions are formed into column shapes in a direction perpendicular to the neck portions 99. Alternatively, each of the bulging portions may be formed into a triangular plate shape having a bottom side connected to the corresponding neck portion 99, a semicircular plate shape having a diameter side connected to the corresponding neck portion 99, etc.

The T-shaped protrusions 97 are formed integrally with the flange portion 95 and have flexibility. Due to the flexibility, the T-shaped protrusions 97 can be opened desirably so that the bulging portions can be displaced outward. Therefore, the neck portions 99 of the T-shaped protrusions 97 can be inserted from the opening ends 85 of the boot lock notch portions 81. In the T-shaped protrusions 97 in which the neck portions 99 have been inserted into the boot lock notch portions 81, the bulging portions abut against the notch formation pieces 83 so that the T-shaped protrusions 97 can be prevented from coming off rearward. The neck portions 99 of the T-shaped protrusions 97 can be detached from the opening ends 85 in a state in which the ferrule retaining member 15 is not mounted into the housing 17. On the other hand, when the ferrule retaining member 15 is mounted into the housing 17, the opening ends 85 are closed by the side wall inner surfaces 77 so that the neck portions 99 cannot come off from the opening ends 85. In this manner, the T-shaped protrusions 97 can be prevented surely from coming off from the boot lock notch portions 81, and the housing 17, the ferrule retaining member 15 and the boot 87 can be fixed and assembled integrally with one another.

The fiber insertion passages 25 are formed through the fastening portion 21 in the ferrule retaining member 15 according to the embodiment. The fiber insertion passages 25 receive the optical fibers 27 which have been led out from the optical fiber cable 37 from which the tensile strength wire 43 and the jacket 41 have been removed. At the same time, each of the fiber insertion passages 25 has an expansion space 103 (see FIG. 6A) that ensures an interference avoidance gap 101 (see FIG. 6B) with the outer circumference of the corresponding inserted optical fiber 27 in the fastening portion 21 on which the tightening ring 23 is tightly fastened.

A fiber retaining protrusion 107 is provided to protrude from one of groove opening opposed surfaces 105 in each of the fiber insertion passages 25. Due to the fiber retaining protrusion 107, a gap W between the groove opening opposed surfaces 105 wider than the diameter D of the optical fiber 27 is partially reduced.

Next, a method for assembling the optical connector 11 having the aforementioned configuration will be described. To assemble the optical connector 11, first, the boot 87 and the tightening ring 23 are passed sequentially through the cable distal end portion 39 of the optical fiber cable 37. The ferrules 13 are fixed to the distal end portions 45 of the optical fibers 27 which are exposed in the cable distal end portion 39 from which the jacket 41 and the tensile strength wire 43 have been removed. Next, the ferrules 13 are placed on the support portion 49 of the ferrule retaining member 15 while the optical fibers 27 are put into the fiber insertion passages 25 recessed in the ferrule retaining member 15. At this time, the pair of U-shaped support portions 57 of the support portion 49 can retain the ferrules 13 respectively along their outer circumferential surfaces and can lock the annular portions 51 so as to restrain the ferrules 13 from moving toward the distal end side. Consequently, the fixation work for retaining the ferrules 13 on the support portion 49 becomes easy.

Next, the distal end of the spring member 19 covering the fiber insertion passages 25 and mounted on the ferrule retaining member 15 is engaged with the rear surfaces of the annular portions 51 so that the ferrules 13 can be biased forward in the axial direction. After the tensile strength wire 43 and the jacket 41 of the cable distal end portion 39 are placed on the fastening portion 21 of the retaining member rear end portion 65 from which the optical fibers 27 are led out, the outer circumference of the tensile strength wire 43 and the jacket 41 of the cable distal end portion 39 is tightly held in place by the tightening ring 23 (see FIG. 5). Next, the ferrule retaining member 15 having retained the ferrules 13 is inserted from the rear opening 31 of the housing 17 and assembled in the housing 17 together with the boot 87.

The neck portions 99 of the T-shaped protrusions 97 of the boot 87 are inserted into the boot lock notch portions 81 of the ferrule retaining member 15 from the outside (in a direction perpendicular to the axis of each neck portion 99) while being bent. In this manner, each of the bulging portions of the T-shaped protrusions 97 abuts against the pair of notch formation pieces 83 between which the boot lock notch portion 81 is put. Thus, the optical fiber cable 37 can be prevented from coming off in the lead-out direction. At this time, the neck portions 99 of the T-shaped protrusions 97 can be elastically deformed and inserted easily from the opening ends 85 into the boot lock notch portions 81 of the ferrule retaining member 15 which has not been received inside the housing. That is, temporary assembling between the boot 87 and the ferrule retaining member 15 can be performed easily.

On the other hand, in permanent assembling for integrating the housing 17, the ferrule retaining member 15, and the boot 87 with one another, the ferrule retaining member 15 in which the T-shaped protrusions 97 have been locked to the boot lock notch portions 81 is inserted from the rear opening 31 of the housing 17. When the boot lock notch portions 81 into which the neck portions 99 of the T-shaped protrusions 97 have been inserted are received inside the housing 17, the opening ends 85 are closed by the side wall inner surfaces 77 of the housing 17. In this manner, the T-shaped protrusions 97 can be surely prevented from coming off from the boot lock notch portions 81.

In the embodiment, the boot 87 and the tightening ring 23 are put on the optical fiber cable 37 sequentially from the cable distal end portion 39 side in which the jacket 41 and the tensile strength wire 43 have been peeled off to expose the optical fibers 27. Then, the ferrules 13 are connected to the optical fibers 27. After the tensile strength wire 43 and the jacket 41 have been fixed to the fastening portion 21 by the tightening ring 23, the tightening ring 23 is covered with the protection portion 89 of the boot 87. Of the boot 87 which has covered the tightening ring 23, the T-shaped protrusions 97 protruding forward from the flange portion 95 on the inner side of the housing are locked by the ferrule retaining member 15. Finally, the ferrule retaining member 15 which has locked the boot 87 is mounted from the rear opening 31 of the housing 17. That is, both the temporary assembling for assembling the boot 87 onto the ferrule retaining member 15 and the permanent assembling for assembling the ferrule retaining member 15 and the housing 17 with each other can be performed in the same assembling direction along the axis of the optical fiber cable 37. Thus, each assembling can be performed easily. That is, it is easy to adapt the assembling to automation.

In the assembling method described above, the members that need to be put on the optical fibers 27 in advance are only two members, i.e. the boot 87 and the tightening ring 23. The optical fibers 27 with the ferrules 13 fixed to the distal end portions 45 of the optical fibers 27 are inserted and arranged into the fiber insertion passages 25 of the ferrule retaining member 15 from the perpendicular direction to the fiber axis. When the spring member 19 is attached to the ferrule retaining member 15, the fiber insertion passages 25 are closed so that the optical fibers 27 retained in the closed fiber insertion passages 25 and the ferrules 13 can be prevented from coming off. When the annular portions 51 are further put between the support portion 49 and the spring plate 19 in a state in which the ferrules 13 are biased in the direction along the axis, the ferrules 13 are retained surely. In this manner, the ferrules 13 fixed to the optical fibers 27 of the optical fiber cable 37 respectively are retained by the support portion 49 while being biased by the spring member 19 so that the optical fiber cable 37 can be assembled with the ferrule retaining member 15. That is, the pair of ferrules 13 biased by the spring member 19 can be inserted into the housing 17 simultaneously and easily.

Next, an effect of the optical connector 11 having the aforementioned configuration will be described. In the aforementioned optical connector 11, the spring member 19 or the ferrule retaining member 15 does not have to be put on the optical fibers 27 in advance when the fiber terminals are processed. Accordingly, terminal processing work can be improved. In addition, the spring member 19 is fixed so as to cover the fiber insertion passages 25 in which the optical fibers 27 have been received. Thus, the optical fibers 27 can be prevented from coming off when they are inserted into the housing. Further, the ferrules 13 are retained by the ferrule retaining member 15 in the state in which the annular portions 51 of the ferrules 13 are put between the support portion 49 and the spring member 19 and brought into elastic contact with the U-shaped protrusions 57 of the support portion 49 by the spring member 19. Accordingly, the work for inserting the ferrule retaining member 15 into the housing can be easy.

Figure 5:
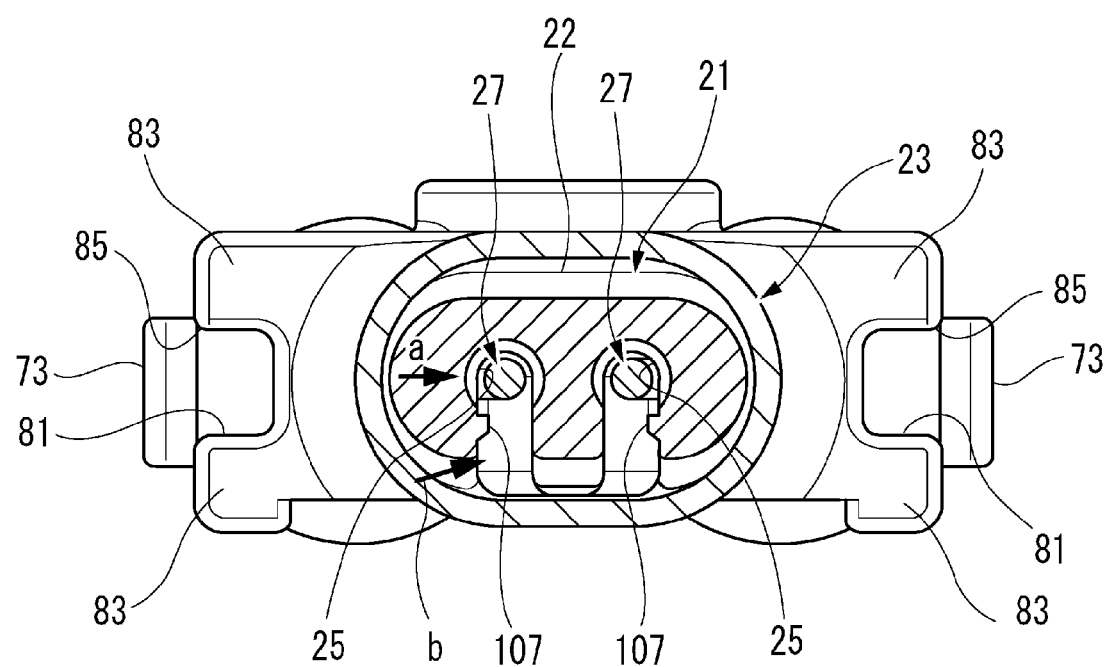
FIG. 5 is a partially sectional view showing a state in which the tightening member has been mounted on a fastening portion of the fastening sleeve shown in FIG. 3.

According to the optical connector 11 according to the embodiment, the optical fibers 27 which are led out from the optical fiber cable 37 from which the jacket 41 and the tensile strength wire 43 have been removed are inserted into the fiber insertion passages 25 which are formed through the fastening portion 21 of the ferrule retaining member 15, as shown in FIG. 5. Each of the fiber insertion passages 25 has the expansion space 103 that ensures the interference avoidance gap 101 prior to the fastening work of the tightening ring 23, to thereby sufficiently space the inner surface of the fiber insertion passage 25 from the optical fiber 27. The tensile strength wire 43 and the jacket 41 are placed on the outer circumferential surface of the fastening portion 21, and the tightening ring 23 further placed on the outer circumferential surface is tightly fastened so that the tensile strength wire 43 and the jacket 41 are pressed onto the fastening portion 21. At this time, the fastening portion 21 is compressed and deformed in a direction designated by an arrow a of FIG. 5. Particularly, in the fiber insertion passages 25 shaped like grooves into which the optical fibers 27 can be inserted afterward, outer side portions of the groove opening opposed surfaces 105 are deformed toward the center as designated by an arrow b. Deformation of the fastening portion 21 narrows the fiber insertion passages 25 into which the optical fibers 27 have been inserted, to thereby reduce the expansion spaces 103 provided in advance in the fiber insertion passages 25.

Here, the expansion spaces 103 remain as the interference avoidance gaps 101 when the fastening is completed. The optical fibers 27 are spaced from the inner surfaces of the narrowed fiber insertion passages 25 by the interference avoidance gaps 101. That is, the optical fibers 27 can be prevented from being held. Even when one side of each of the optical fibers 27 in the diameter direction makes contact with the inner surfaces of the fiber insertion passages 25, the optical fibers 27 are allowed to move in the axial direction for the fiber position adjustment function as long as the opposite sides of each of the optical fibers 27 are spaced from the inner surfaces. That is, even after the fastening work of the tightening ring 23, the optical fibers 27 can be inserted in a so-called floating structure so as not to interfere with the fiber insertion passages 25.

Figure 6A:
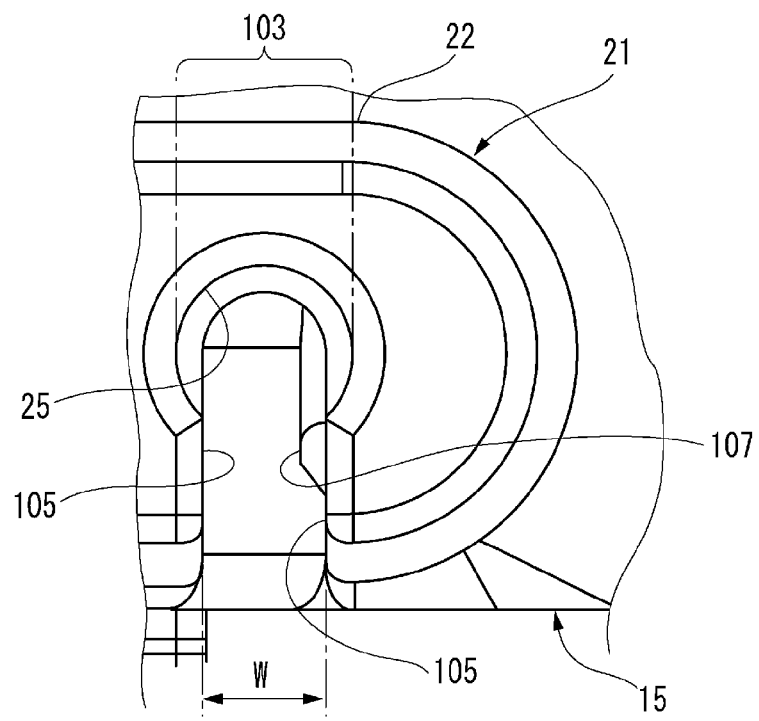
FIG. 6A is an enlarged back view of a main part of the fastening sleeve shown in FIG. 3.
Figure 6B:
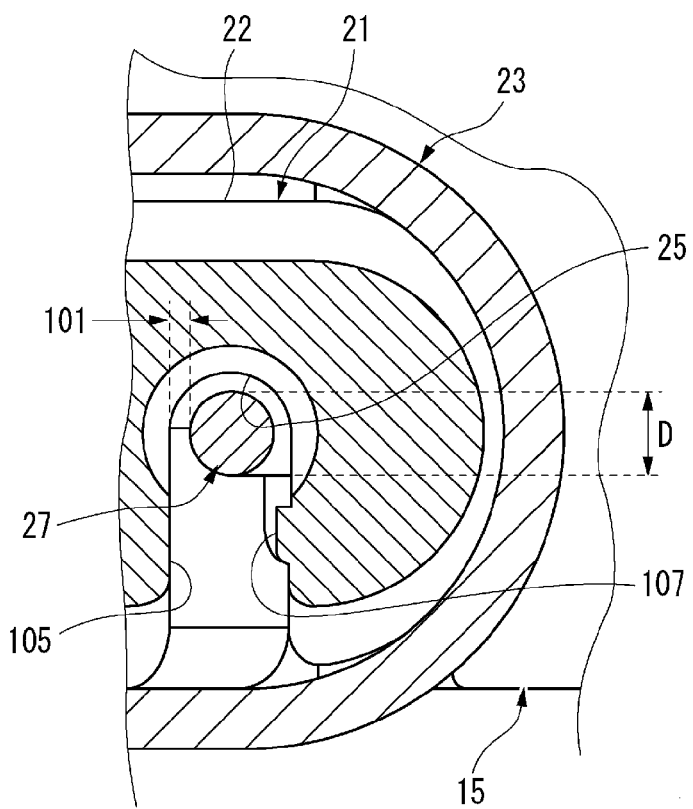
FIG. 6B is an enlarged view of the main part of the fastening sleeve shown in FIG. 5.
Figure 7:
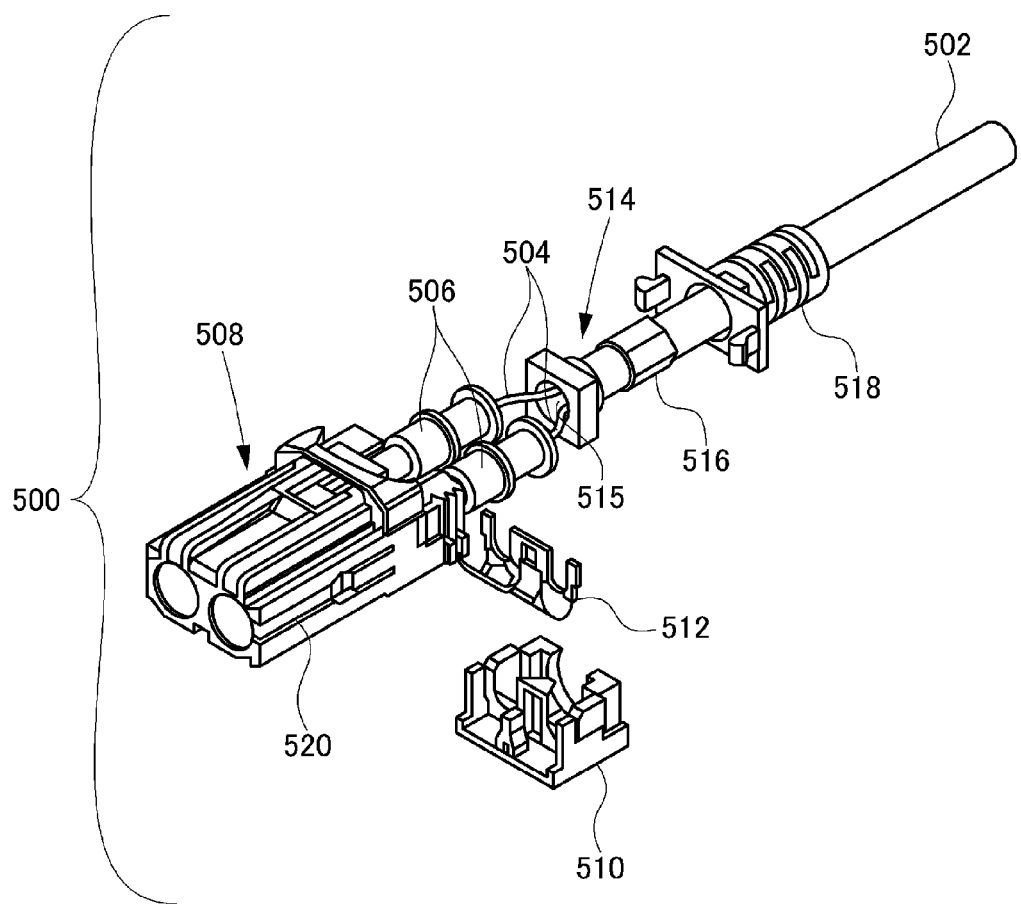
FIG. 7 is an exploded perspective view of a conventional optical connector.

In addition, according to the optical connector 11 according to the embodiment, the optical fibers 27 can be inserted into the fiber insertion passages 25 from the perpendicular direction to the axis, and the ferrule retaining member 15 does not have to be put onto the optical fiber cable 37 in advance. Accordingly, the fiber terminal processing works can be improved. In addition, as shown in FIG. 6A, each of the fiber insertion passages 25 is configured to have an opened cross section having a shape of a C-shaped groove. Thus, the width W of the groove opening can be narrowed while the expansion space 103 is secured inside the groove. Consequently, the optical fibers 27 which have been inserted into the expansion spaces 103 of the fiber insertion passages 25 can be prevented from coming off easily at the time of processing the fiber terminals so that the optical terminal processing work can be improved.

Further, in the optical connector 11 according to the embodiment, the fiber retaining protrusion 107 is provided to protrude from one of groove opening opposed surfaces 105 of each of the fiber insertion passages 25, to partially reduce the gap W between the groove opening opposed surfaces 105 wider than the diameter D of the optical fiber 27. Thus, it is possible to partially reduce the gap W between the groove opening opposed surfaces 105 wider than the diameter D of the optical fiber 27 while securing the expansion space 103 inside the groove.

Accordingly, the optical fibers 27 which have been inserted into the expansion spaces 103 of the fiber insertion passages 25 are engaged with the fiber retaining protrusions 107 to be prevented from coming off easily at the time of processing the fiber terminals. Thus, the fiber terminal processing works can be improved. Each of the fiber retaining protrusions 107 is shaped not into a protrusive strip continuous over the entire length of the fiber insertion passage 25 but into a comparatively short protrusion. The fiber retaining protrusion 107 does not have a height by which the gap W is made excessively smaller than the diameter D of the optical fiber 27. Accordingly, resistance to insertion of the optical fiber 27 into the fiber insertion passage 25 is not increased to a degree that would make the insertion work inefficient.

Accordingly, according to the optical connector 11 according to the embodiment, the optical fibers 27 are not held when the tightening ring 23 is subjected to fastening work. Thus, the fastening work can be improved. The optical connector according to the invention is not limited to the embodiment described above, and changes and modifications may be made therein as appropriate. Moreover, materials, shapes, dimensions, numbers, locations of the respective elements in the embodiment described above are not limited, and are optional in so far as the present invention can be achieved.

For example, in the embodiment described above, the tightening ring 23 shaped like an elliptic cylinder is used as the tightening member to hold the jacket 41 and the tensile strength wire 43 of the optical fiber cable 37 placed on the outer circumferential surface 22 of the fastening portion 21 of the ferrule retaining member 15. However, the invention is not limited thereto. A fastening plate shaped like a substantially elliptic cylinder may be used alternatively. The fastening plate formed into a substantially elliptic cylindrical shape by bending a rectangular metal plate has a slit along the axis of the optical fiber cable 37, and tightly holds the jacket 41 and the tensile strength wire 43 of the optical fiber cable 37 at the fastening portion 21. In addition, in the embodiment described above, the ferrule retaining member 15 provided with the support portion 49 for retaining the ferrules 13 is used as the fastening sleeve having the fastening portion. However, the invention is not limited thereto. A fastening sleeve in which fiber insertion passages are recessed in its side surface or a fastening sleeve in which fiber insertion passages are formed through the fastening sleeve in the axial direction may be used alternatively.

Here, the aforementioned characteristics of the embodiment of the optical connector according to the invention will be summarized briefly in the following [1] to [3].

[1] An optical connector 11 including a ferrule 13 configured to be connected to a cable distal end portion 39 of an optical fiber cable 37, a fastening sleeve (a ferrule retaining member) 15 having, at its rear end portion, a fastening portion 21 inside which an optical fiber 27 led out from the optical fiber cable 37, from which a tensile strength wire 43 and a jacket 41 are removed, is inserted, the fastening portion 21 having an outer circumferential surface on which a tightening member (a tightening ring) 23 configured to hold at least one of the tensile strength wire 43 and the jacket 41 in place is tightly fastened, a housing 17 configured to accommodate the ferrules 13 and the fastening sleeve (the ferrule retaining member) 15; and a fiber insertion passage 25 formed to extend through at least the fastening portion 21 and having an expansion space 103 that ensures an interference avoidance gap 101 with an outer circumference of the optical fiber 27 inserted inside the fastening portion 21 on which the tightening member (the tightening ring) 23 is tightly fastened.

[2] An optical connector 11 according to the configuration [1] described above, wherein: the fiber insertion passage 25 is configured to have an opened cross section having a shape of a C-shaped groove.

[3] An optical connector 11 according to the configuration [1] or [2] described above, wherein a fiber retaining protrusion 107 is provided to protrude from at least one of groove opening opposed surfaces 105 of the fiber insertion passage 25 to partially reduce a gap W between the groove opening opposed surfaces 105 that is wider than a diameter of the optical fiber 27.

According to the optical connector according to the invention, the optical fibers are not held when the tightening member is subjected to fastening work so that the fastening work can be improved.

What is claimed is:

1. An optical connector comprising:
    a ferrule configured to be connected to a cable distal end portion of an optical fiber cable;
    a ferrule retaining member provided as a separate piece from the ferrule, the ferrule retaining member comprising:
        at a rear end portion, a fastening portion inside which an optical fiber led out from the optical fiber cable is inserted, the fastening portion having an outer circumferential surface,
        at a distal end portion of the ferrule retaining member, a support portion configured to restrain the ferrule from moving toward a distal end side, and
        a fiber insertion passage formed to extend through at least the fastening portion;
    a tightening member tightly fastened to the outer circumferential surface of the fastening portion and configured to hold at least one of a tensile strength wire and a jacket removed from the optical fiber in place;
    a spring member attached to the ferrule retaining member and configured to elastically bias the ferrule toward the distal end side; and
    a housing configured to accommodate the ferrule and the ferrule retaining member, wherein the fiber insertion passage has an expansion space that provides an interference avoidance gap with an outer circumference of the optical fiber inserted inside the fastening portion onto which the tightening member is tightly fastened, and wherein the tightening member narrows the fiber insertion passage inside the fastening portion when tightly fastened to the outer circumferential surface of the fastening portion, the interference avoidance gap is provided between the outer circumference of the optical fiber and an inner surface of the narrowed fiber insertion passage to allow an axial movement of the optical fiber.

2. The optical connector according to claim 1, wherein the fiber insertion passage is configured to have an opened cross section having a shape of a C-shaped groove.

3. The optical connector according to claim 2, wherein a fiber retaining protrusion is provided to protrude from at least one of groove opening opposed surfaces of the fiber insertion passage to partially reduce a gap that is wider than a diameter of the optical fiber between the groove opening opposed surfaces.

4. The optical connector according to claim 1, wherein the spring member is mounted on the ferrule retaining member and covers the fiber insertion passage.

5. The optical connector according to claim 1, wherein the spring member includes an engagement portion which engages with the ferrule retaining member to keep the spring member attached to the ferrule retaining member.

6. The optical connector according to claim 1, wherein the tightening member constitutes a tightening ring having an elliptical cylindrical shape.

7. An optical connector comprising:
a ferrule configured to be connected to a cable distal end portion of an optical fiber cable;
a ferrule retaining member comprising:
at a rear end portion, a fastening portion inside which an optical fiber led out from the optical fiber cable is inserted, the fastening portion having an outer circumferential surface, and
at a distal end portion of the ferrule retaining member, a support portion configured to restrain the ferrule from moving toward a distal end side;
a tightening member tightly fastened to the outer circumferential surface of the fastening portion and configured to hold at least one of a tensile strength wire and a jacket removed from the optical fiber in place;
a spring member attached to the ferrule retaining member and configured to elastically bias the ferrule toward the distal end side;
a housing configured to accommodate the ferrule and the ferrule retaining member;
a fiber insertion passage formed to extend through at least the fastening portion and having an expansion space that provides an interference avoidance gap with an outer circumference of the optical fiber inserted inside the fastening portion onto which the tightening member is tightly fastened; and
a fiber retaining protrusion protruding from at least one of groove opening opposed surfaces of the fiber insertion passage, a gap between the groove opening opposed surfaces from which the fiber retaining protrusion protrudes being smaller than a gap between the groove opening opposed surfaces that is wider than a diameter of the optical fiber and includes the interference avoidance gap, wherein the tightening member narrows the fiber insertion passage inside the fastening portion when tightly fastened to the outer circumferential surface of the fastening portion, the interference avoidance gap is provided between the outer circumference of the optical fiber and an inner surface of the narrowed fiber insertion passage to allow an axial movement of the optical fiber.

8. The optical connector according to claim 7, wherein the fiber insertion passage is configured to have an opened cross section having a shape of a C-shaped groove.

* * * * *